US006535662B2

(12) United States Patent
Prucnal et al.

(10) Patent No.: US 6,535,662 B2
(45) Date of Patent: Mar. 18, 2003

(54) TOAD HAVING ENHANCED EXTINCTION RATIO OF THE SWITCHING WINDOW

(75) Inventors: Paul R. Prucnal, Princeton, NJ (US); Ivan Glesk, Princeton, NJ (US); Robert Runser, Aberdeen, NJ (US); Christine Coldwell, Columbia, MD (US); Bing C. Wang, Alhambra, CA (US)

(73) Assignee: The Trustees of Princeton University, Princeton, NJ (US)

( * ) Notice: Subject to any disclaimer, the term of this patent is extended or adjusted under 35 U.S.C. 154(b) by 81 days.

(21) Appl. No.: 09/802,767

(22) Filed: Mar. 9, 2001

(65) Prior Publication Data

US 2002/0126946 A1 Sep. 12, 2002

(51) Int. Cl.⁷ .................. G02B 6/26; G01N 21/00; H04J 14/00
(52) U.S. Cl. ............ 385/16; 385/15; 385/18; 385/122; 385/39; 385/42; 385/45; 385/46; 356/345; 359/115; 359/117; 359/124; 359/128
(58) Field of Search .................. 385/15, 16, 17, 385/18, 122, 39, 42, 45, 46, 1, 2, 3; 356/345; 339/115, 117, 124, 128, 139

(56) References Cited

U.S. PATENT DOCUMENTS

| | | | | |
|---|---|---|---|---|
| 5,058,986 A | * | 10/1991 | Nayar et al. | 385/27 |
| 5,301,008 A | * | 4/1994 | Huang et al. | 359/320 |
| 5,315,422 A | * | 5/1994 | Utaka et al. | 359/107 |
| 5,349,464 A | * | 9/1994 | Ishihara et al. | 359/240 |
| 5,493,433 A | | 2/1996 | Prucnal et al. | 359/123 |
| 5,535,001 A | | 7/1996 | Tajima | 356/345 |
| 5,825,519 A | | 10/1998 | Prucnal | 359/127 |
| 5,933,554 A | * | 8/1999 | Leuthold et al. | 385/28 |
| 5,999,293 A | | 12/1999 | Manning | 359/139 |
| 6,049,642 A | * | 4/2000 | Nakamura et al. | 385/16 |

OTHER PUBLICATIONS

J.P. Sokoloff et al., "A Terahertz Optical Asymetric Demultiplexer (TOAD)," IEEE Photonics Technology Letters, vol. 5, No. 7, Jul. 1993, pp. 787–790.
I. Glesk et al., "Demonstration of All–Optical Demultiplexing of TDM Data at 250 Gbit/s," Electronic Letters, vol. 30, No. 4, Feb. 17, 1994, pp. 339–340.
K. I. Kang et al., "Demonstration of All–Optical Mach–Zehnder Demultiplexer," Electronic Letters, vol. 31, No. 9, Apr. 27, 1995, pp. 749–750.
K.I. Kang et al., "Demonstration of Ultrafast, All–Optical, Low Control Energy Single Wavelength, Polarization Independent, Cascadable, and Integratable Switch," Appl. Phys. Lett. 67m (5), Jul. 31, 1995, pp. 605–607.

(List continued on next page.)

Primary Examiner—Brian Healy
(74) Attorney, Agent, or Firm—Wolff & Samson

(57) ABSTRACT

A Terahertz Optical Asymmetric Demultiplexer (TOAD) having preferably two non-linear elements (NLES) in which the extinction ratio is enhanced by saturating both NLEs when closing a switching window. A data signal input on one port of the TOAD is split onto two optical paths, each including one NLE. The optical paths converge at an output port. To start a switching window, a first control signal is input on an optical path that includes only one of the two NLEs. To close a switching window, one or more control signals are input such that both NLEs receive a control signal at a predetermined time after the first control signal is received by one of the NLEs. Only data signals passing through the first NLE during the switching window are output on the output port. Since both NLEs receive a second control signal at the same time, they decay together and thus avoid creation of unintended switching windows. Additionally, in certain embodiments of the present invention, the second control signal can be input on the data port or the output port, eliminating the need for a separate port for the second control signal as required by certain known TOADs.

18 Claims, 5 Drawing Sheets

OTHER PUBLICATIONS

Ivan Glesk et al., "Polarization Insensitive Terabit Optical Demultiplexer for TDMA Networks," SPIE vol. 2481, Jun. 1995, pp. 13–21.

K.I. Kang et al., "Ultrafast Optical Time Demultiplexers Using Semiconductor Optical Amplifiers," International Journal of High Speed Electronics and Systems, vol. 7, No. 1 (1996), pp. 125–151.

Paul Toliver et al., "Comparison of Three Nonlinear Interferometric Optical Switch Geometries," Optics COmmunications, vol. 175, Mar. 1, 2000, pp. 365–373.

Deyu Zhou et al., "An Analysis of Signal–to–Noise Ratio and Design Parameters of a Terahertz Optical Asymetric Demultiplexer," Journal of Lightwave Technology, vol. 17, No. 2, Feb. 1999, pp. 298–307.

S. Nakamura et al., "Experimental Investigation on High–Speed Switching Characteristics of a Novel Symmetric Mach–Zehnder All–Optical Switch," Appl. Phys. Lett. 65 (3), Jul. 18, 1994, pp. 283–285.

* cited by examiner

TOAD HAVING ENHANCED EXTINCTION RATIO OF THE SWITCHING WINDOW

FIELD OF THE INVENTION

The present invention relates generally to a Terahertz Optical Asymmetric Demultiplexer (TOAD) and, more particularly, to a TOAD having an enhanced extinction ratio; i.e., that cleanly closes its switching window, avoiding inadvertent switching of signals after the switching window has closed.

BACKGROUND

Different TOAD configurations have been described in various patents, patent applications and other publications. For example, a Sagnac-loop TOAD is described in U.S. Pat. No. 5,493,433, a Mach-Zehnder TOAD is described in 5,825,519, and a Michelson TOAD is described in pending application Ser. No. 09/612,427, filed Jul. 7, 2000, pending. Generally, a TOAD is an optical device having a data signal input port, one or more control signal input ports, one or more non-linear elements, each having a first state in which a characteristic (such as phase) of the light passing through it has a first value and a second state in which a characteristic of the light passing through it is changed to a second value, and an output port. The data input port, the control input port or ports and the output port are coupled to the one or more non-linear elements such that at least two optical paths are formed from the data input port to the output port, each including a non-linear element. One or more control signals input at the control input port or ports cause the non-linear element in each path to change from its first state to its second state. An optical data signal input to the data input port will produce an output data signal on the output port if light on the two optical paths arrives at the output port having passed through different non-linear element states. The optical paths may include the same non-linear element or elements or different elements. If the light signals on the two optical paths do not pass through different non-linear element states, substantially no output data signal is produced on the output port.

In TOADs using more than one non-linear elements, such as the Mach-Zehnder TOAD and Michelson TOAD, current TOAD configurations create a switching window by first saturating the non-linear element in one optical path and then, at a time $\tau$ later, saturating the non-linear element in the other optical path. Saturating a non-linear element causes it to change from its first state to its second state. Only data signals passing through the first and second non-linear elements during the window of duration $\tau$ when the first non-linear element is saturated and the second non-linear element is not saturated will be switched to the output port. One drawback of such current TOAD configurations is that since the first and second non-linear elements are saturated at different times, they decay to their non-saturated states at different times, leading to residual leakage of light through the output port outside the switching window. The maximum extinction ratio of such TOADs (i.e., the ratio of the output power from the switch in its off state to the output power in its on state), which is ideally as close to zero as possible, may thus be higher than desired. This causes, for example, a crosstalk penalty when the device is configured as a demultiplexer in an OTDM (Optical Time Division Multiplexing) network, i.e., light may leak to the output port after the switching window has closed into subsequent time slots.

In addition, certain TOAD configurations, such as the forward-pumped Mach-Zehnder TOAD (shown in FIGS. 1 and 2 of U.S. Pat. No. 5,825,519) and the Michelson TOAD (shown in pending application Ser. No. 09/612,427, filed Jul. 7, 2000, pending), require four ports: a data port, two control ports, and an output port. It would be advantageous to reduce the number of ports to facilitate integration of such devices and to reduce the complexity of packaging such devices, including the coupling of optical fibers to the wave guides.

SUMMARY OF INVENTION

It is therefore an object of the present invention to provide an enhanced extinction ratio for TOADs having at least one unique non-linear element in each of its at least two optical paths from its data input port to its output port.

It is a further object of the present invention to reduce the number of ports required by certain Mach-Zehnder and Michelson TOADs.

Briefly, a TOAD in accordance with the present invention has preferably two non-linear elements (NLEs). A data signal is input on one port and is split onto two optical paths, each including one NLE. The optical paths converge at an output port. To start a switching window, a first control signal is input on an optical path that includes only one of the two NLEs. To close a switching window, one or more control signals are input such that both NLEs receive a control signal at a predetermined time after the first control signal is received by one of the NLEs. Only data signals passing through the first NLE during the switching window are output on the output port.

Since both NLEs receive a second control signal at the same time, they will decay together and thus avoid creation of unintended switching windows.

Additionally, in certain embodiments of the present invention, the second control signal can be input on the data port or the output port, eliminating the need for a separate port for the second control signal, as required in certain known TOADs.

BRIEF DESCRIPTION OF THE DRAWINGS

A fuller understanding of the present invention may be obtained by reference to the following detailed description and to the drawings, wherein like reference numerals are used to identify similar components in the various figures and in which.

DETAILED DESCRIPTION

Figure 1:
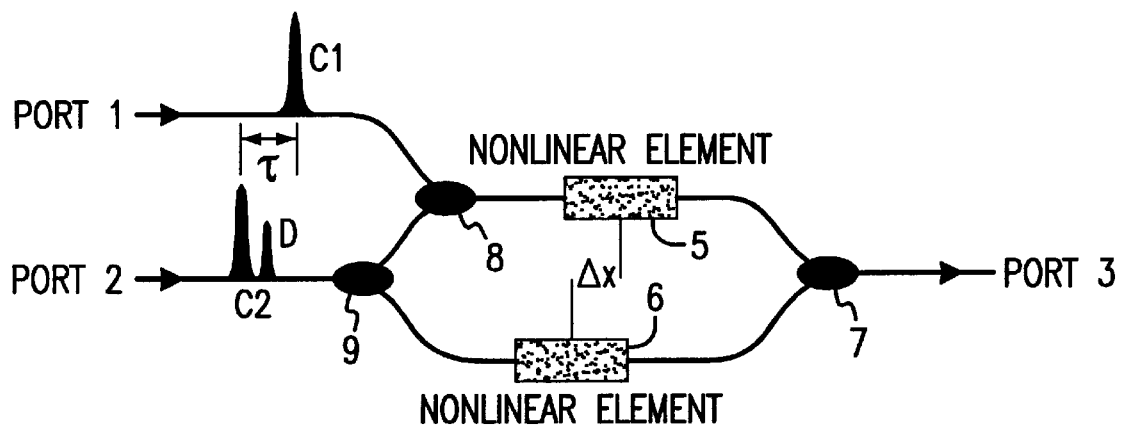
FIG. 1 depicts a Mach-Zehnder TOAD in accordance with one embodiment of the present invention.

FIG. 1 illustrates a Mach-Zehnder TOAD in accordance with one embodiment of the present invention. A Mach- Zehnder TOAD is a TOAD utilizing a Mach-Zehnder interferometer configuration. In this embodiment, the TOAD is in a forward-pumped configuration, i.e., the control pulses propagate in the same direction as the data pulses. Unlike known forward-pumped Mach-Zehnder TOADs, which require four ports (see, e.g., FIGS. 1 and 2 of U.S. Pat. No. 5,825,519), the forward-pumped Mach-Zehnder TOAD in accordance with this embodiment of the present invention requires only three ports.

Referring to FIG. 1, the switching window is determined by the temporal offset, $\tau$, between the control pulses and the offset, $\Delta x$, between NLEs 5 and 6 in the upper and lower arms of the TOAD. In a preferred embodiment $\Delta x$ is 0, causing C2 to arrive at NLEs 5 and 6 at the same time. However, even if $\Delta x$ is not 0, some benefit is gained by this configuration over known forward-pumped Mach-Zehnder TOADs because it has three ports instead of four ports.

Before the injection of any control pulses, NLEs 5 and 6 are, in one embodiment, biased so that the data signal D injected into port 2 experiences destructive interference at coupler 7, which in turn prevents any output signal on output port 3. Coupler 7 is preferably a directional 2×2 3 dB (50-50) coupler, having two input ports and two output ports; a signal is output on one of the output ports, and substantially no signal is output on the other output port, if the signals on the input ports are in phase (i.e., constructively interfere) and have the same amplitude, and a signal is likewise output on the other output port if the input signals are 180° out of phase (i.e., destructively interfere) and have the same amplitude. Only one of the output ports is shown for coupler 7. One skilled in the art will appreciate that the NLEs may be biased or tuned or the geometry of the TOAD configured so that one or the other of coupler 7's output ports may serve as output port 3. For example, NLEs 5 and 6 can alternatively be biased or tuned such that, before injection of any control pulses, a data signal injected at port 2 experiences constructive interference at coupler 7, in which case output port 3 would be the output of coupler 7 which produces no output signal under these circumstances. Techniques for biasing or tuning an NLE include, for example, setting the temperature of the NLE and setting a DC bias voltage across the NLE, both of which adjust the optical properties of the NLE. Additionally, a TOAD can be tuned by, for example, adjusting the length of an arm of the TOAD, such that the desired destructive or constructive interference occurs at the output of the TOAD—for example, to create destructive interference one arm of the TOAD may be made slightly longer than the other to provide a 180.degree phase shift between the arms; to create constructive interference the arms may be tuned so that they are the same length.

Couplers 8 and 9 may be 2×2 couplers like coupler 7 with unused ports tied off to prevent back reflection, as is known in the art. Alternatively, coupler 8 may be a 2×1 combiner coupler and coupler 9 may be a 1×2 splitter coupler. The selection of appropriate couplers in this embodiment and in the embodiments described below would be apparent to those skilled in this art.

When control pulse C1 is injected into port 1 it passes through coupler 8 onto the upper arm of the interferometer. A switching window is then effectively opened since the control pulse alters the state of NLE 5, causing subsequence signals in the upper arm to experience a phase shift of approximately $\pi$ when passing through it (in effect, altering the optical path length in the upper arm). The data signals passing through the upper and lower arms thus pass through NLEs in different states and experience, in this embodiment, constructive interference at coupler 7, resulting in an output data signal on port 3. The switching window is closed through the injection of the second control pulse C2 into port 2. C2 passes through coupler 9 onto the upper and lower arms of the interferometer. C2 closes the switching window by saturating both NLE 5 and NLE 6, thus restoring the destructive interference condition at coupler 7 since data signals on both the upper and lower arms of the interferometer experience the same phase shift. If $\Delta x$ is 0, NLE 5 and NLE 6 will experience C2 simultaneously and recover together, thus enhancing the extinction ration of the switching window.

A preferred implementation of the present invention employs integrated optical waveguides, made from, for example, semiconductor materials, lithium niobate, glass or a polymer. The NLE devices can be made with a nonlinear optical material such as a semiconductor optical amplifier, a passive semiconductor, lithium niobate, a doped polymer, erbium-doped glass or any other material that produces a phase shift in light. Also, in a hybrid implementation (i.e., an implementation in which various materials are used instead of, for example, a doped polymer), the NLE can be introduced in a slot in a waveguide. For example, a glass waveguide can be used, wherein slots are left open for the nonlinear elements. A gallium arsenide/aluminum gallium arsenide semiconductor optical amplifier, for example, can then be positioned in the open slot.

Figure 2:
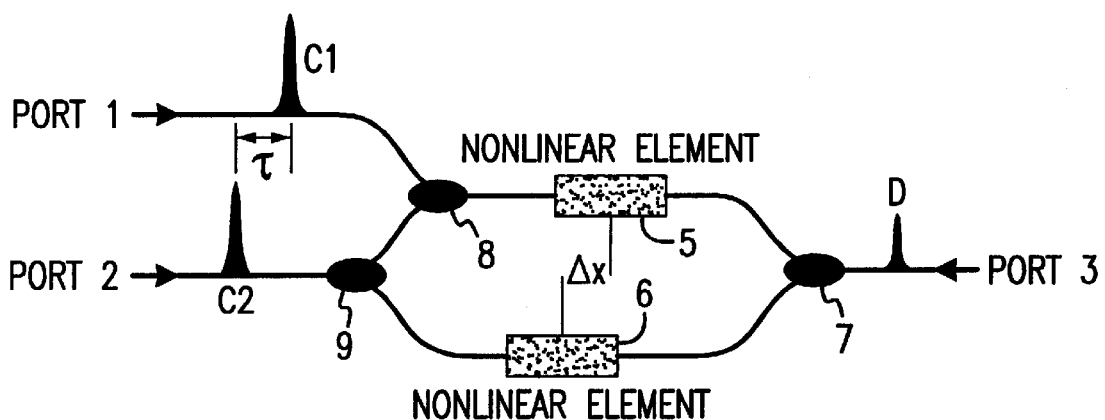
FIG. 2 depicts a Mach-Zehnder TOAD in accordance with another embodiment of the present invention.
Figure 3:
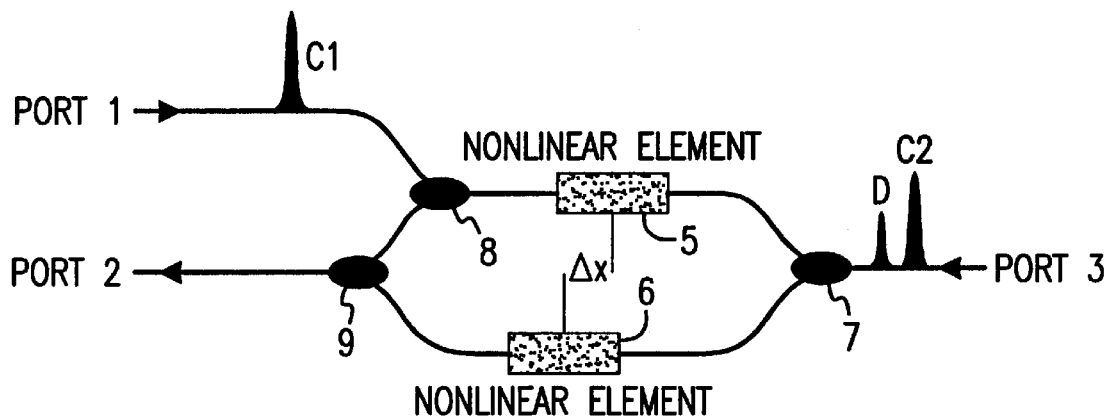
FIG. 3 depicts a Mach-Zehnder TOAD in accordance with yet another embodiment of the present invention.
Figure 4:
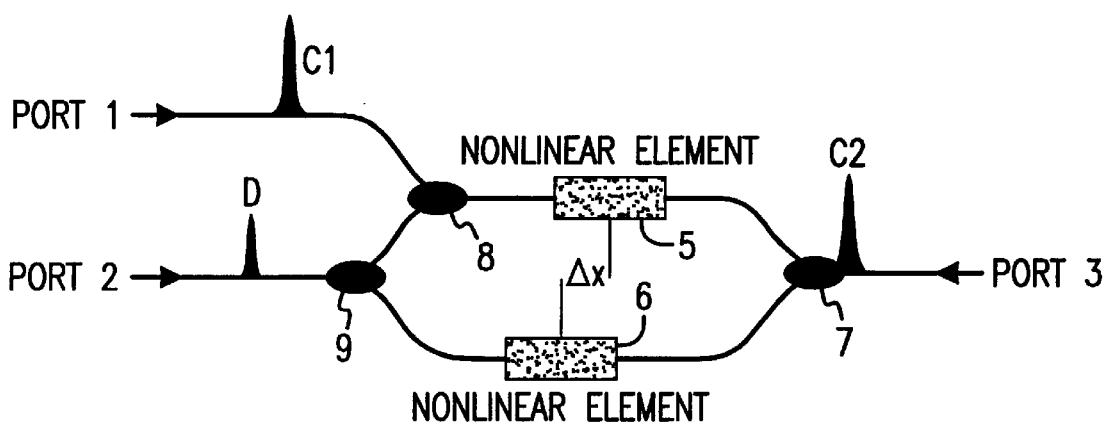
FIG. 4 depicts a Mach-Zehnder TOAD in accordance with still another embodiment of the present invention.

FIGS. 2–4 illustrate alternative embodiments of a Mach-Zehnder TOAD in accordance with the present invention.

In FIG. 2, control signals C1 and C2 are co-propagating (i.e., propagating in the same direction) and are input on ports 1 and 2, respectively, separated by time interval $\tau$. Data signal D is input on port 3 and the output signal of the TOAD is produced on port 2. C1 and D are said to be counter-propagating in this embodiment since they propagate through the TOAD in opposite directions.

In FIG. 3, C1 is input on port 1 and C2 and D are input on port 3. C1 and C2 are timed to create a switching window of duration $\tau$, assuming $\Delta x$ is 0. The output signal is produced on port 2.

In FIG. 4, C1 is input on port 1, C2 is input on port 3, and D is input on port 2. Again, C1 and C2 are timed to create a switching window of duration $\tau$, assuming $\Delta x$ is 0. The output signal is produced on port 3.

In each of the embodiments shown in FIGS. 1–4, the switching window may be adjusted by adjusting the values of $\tau$ and $\Delta x$. In a preferred embodiment, $\Delta x$ is 0, so that nonlinear elements 5 and 6 recover together following control pulse C2. Also, in the case where data signal D is counter-propagating with respect to either one of the clock pulses C1 or C2, such as in FIGS. 2–4, the duration of the switching window is also determined by the length of the NLE. Couplers 7, 8 and 9 in FIGS. 2–4 may be 2×2 couplers with unused ports tied off or any other suitable coupler.

Figure 6:
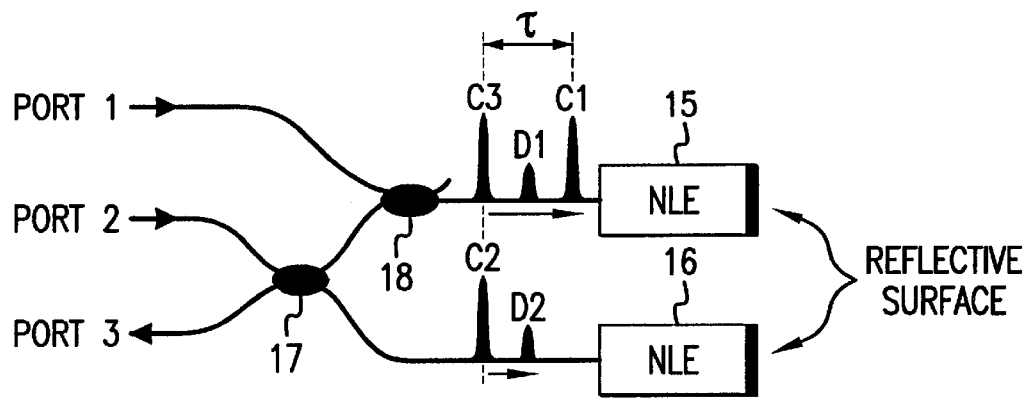
FIG. 6 depicts a Michelson TOAD in accordance with one embodiment of the present invention.
Figure 7:
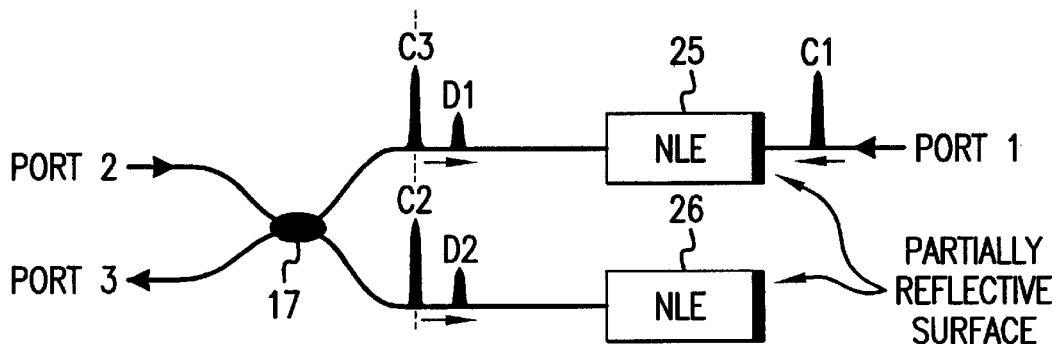
FIG. 7 depicts a Michelson TOAD in accordance with another embodiment of the present invention.
Figure 8:
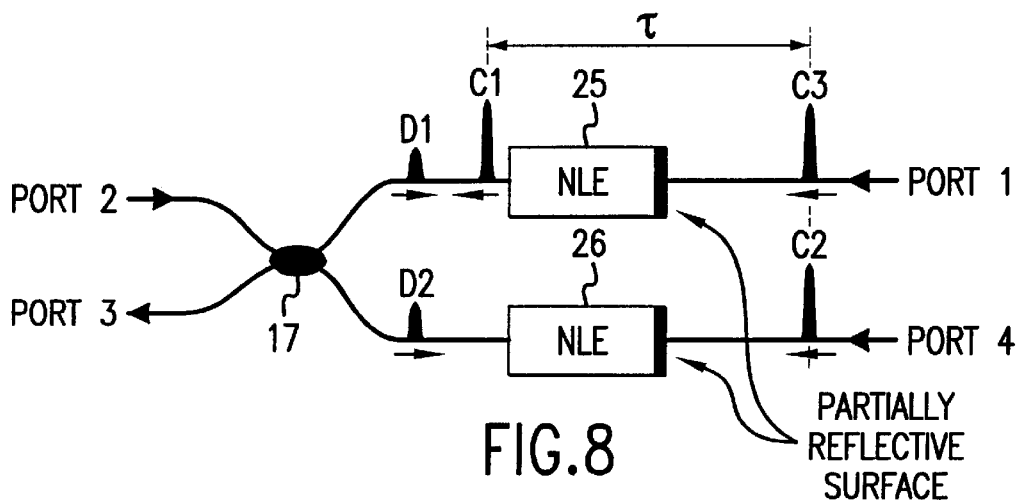
FIG. 8 depicts a Michelson TOAD in accordance with yet another embodiment of the present invention.

FIGS. 6–8 illustrate embodiments of a Michelson TOAD in accordance with the present invention.

In FIG. 6, the Michelson interferometer is balanced such that (i) a data pulse D entering port 2 will split into the two independent arms of the interferometer at coupler 17, creating pulses D1 and D2, and (ii) D1 and D2 will reflect off the coated faces of nonlinear elements 15 and 16, respectively, and, in one embodiment, destructively interfere at coupler 17, producing no output on output port 3. Coupler 17, like coupler 7 described above, is preferably a 2×2 coupler; the specific ports of coupler 17 serving as port 2 and port 3 depends on the biasing of the NLEs and the geometry of the TOAD, as one skilled in the art would appreciate.

Nonlinear elements 15 and 16 are coated on one side to have preferably 100% reflectivity. In the presence of control pulses at ports 1 and 2, all-optical switching occurs as follows. A first control pulse C1 is input on port 1, passes through coupler 18, and saturates NLE 15. A second control pulse is input on port 2 and passes through coupler 17, creating pulses C2 and C3. C3 passes through coupler 18 and follows C1 to NLE 15 by time interval ρ. C2 proceeds to NLE 16, arriving at NLE 16 also at time interval τ after C1 arrived at NLE 15. C2 and C3 then saturate NLEs 16 and 15, respectively, time interval τ after C1 saturated NLE 15. A data pulse input on port 2 will split into pulses D1 and D2 at coupler 17, which in turn will reflect off NLEs 15 and 16. If D1 arrives at NLE 15 in the interval τ after C1 arrived at NLE 15 but before C3 arrives at NLE 15, D1 and D2 will reflect off NLEs 15 and 16 respectively while the NLEs are in different states; i.e., NLE 15 will be saturated and NLE 16 will not be saturated. D1 will thus experience a phase change of preferably approximately π, while D2 will experience no phase change. When D1 and D2 then arrive back at coupler 17, they will, in this embodiment, interfere constructively, producing an output signal on port 3.

Thus, only data pulses that fall between C1 and C3 are switched to port 3. The temporal duration of the switching window is given by the time separation τ between C1 and C3. Also, since C2 and C3 arrive at NLEs 15 and 16 at substantially the same time, NLEs 15 and 16 will recover substantially in phase, thus preventing the creation of an unintended switching window.

FIG. 7 shows another embodiment of a Michelson TOAD in accordance with the present invention. In this embodiment, port 1 is used to inject a single control pulse C1 into NLE 25 to create a differential phase change in the two interferometer arms. The right face of NLEs 25 and 26 are partially reflective; NLE 25 is partially reflective so that C1 can be injected and NLE 26 is partially reflective to maintain a balance between the optical losses in the two arms. A second control pulse is input on port 2 and passes through coupler 17, creating pulses C2 and C3. The switching window opens for the interval when NLE 25 is saturated while NLE 26 is not saturated. In this case, a data pulse that is input such that D1 travels ahead of C3 but arrives at NLE 25 after C1 has passed through it will be output on port 3. When C2 and C3 arrive at NLEs 25 and 26 respectively, the NLEs simultaneously saturate, reestablishing the phase balance in the two arms of the interferometer and closing the switching window.

FIG. 8 shows still another embodiment of a Michelson TOAD in accordance with the present invention. In this embodiment, the data and control signals counter-propagate with respect to each other. Data pulses are input at port 2 and control signals are input at ports 1 and 4. Data pulses are all-optically switched from port 2 to port 3 when a differential phase change is induced between the two interferometer arms. Data pulses that arrive at NLEs 25 and 26 after C1 has saturated NLE 25 but before C2 and C3 have saturated NLEs 25 and 26, respectively, are switched to port 3. The switching window is determined by the temporal offset τ between C1 and C3. C2 and C3 are timed to arrive at NLEs 26 and 25, respectively, at substantially the same time As depicted in FIGS. 6–8, the arrows beneath the pulses represent the propagation direction of the pulses prior to entering an NLE for the first time.

In the Mach-Zehnder and Michelson configurations where the data output signals and control signals appear on the same port, different techniques may be used to distinguish the data output signals from the control signals. These techniques include, but are not limited to, wavelength, amplitude and polarization discrimination.

Figure 5A:
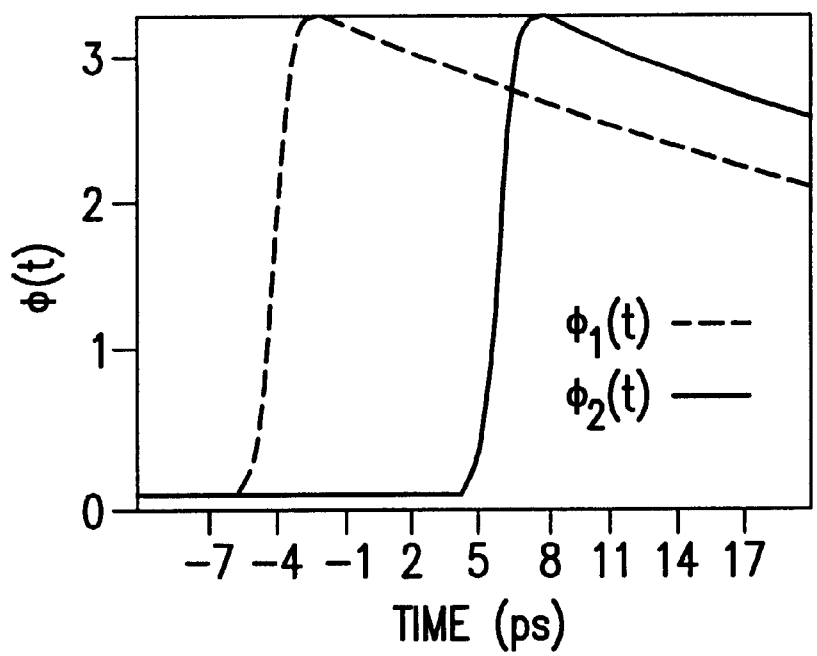
FIG. 5 illustrates a theoretical comparison of the performance of a known TOAD versus a TOAD in accordance with the present invention.
Figure 5B:
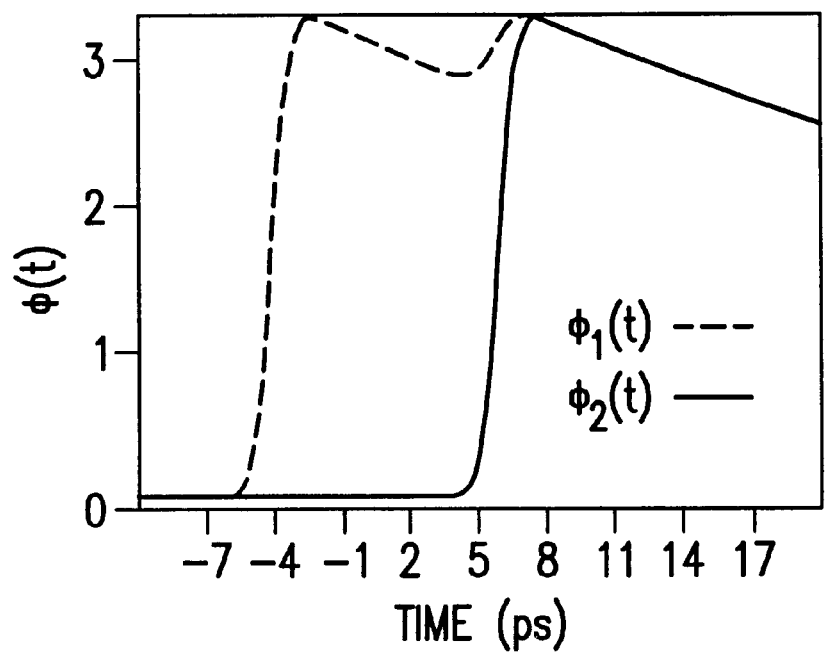
Figure 5C:
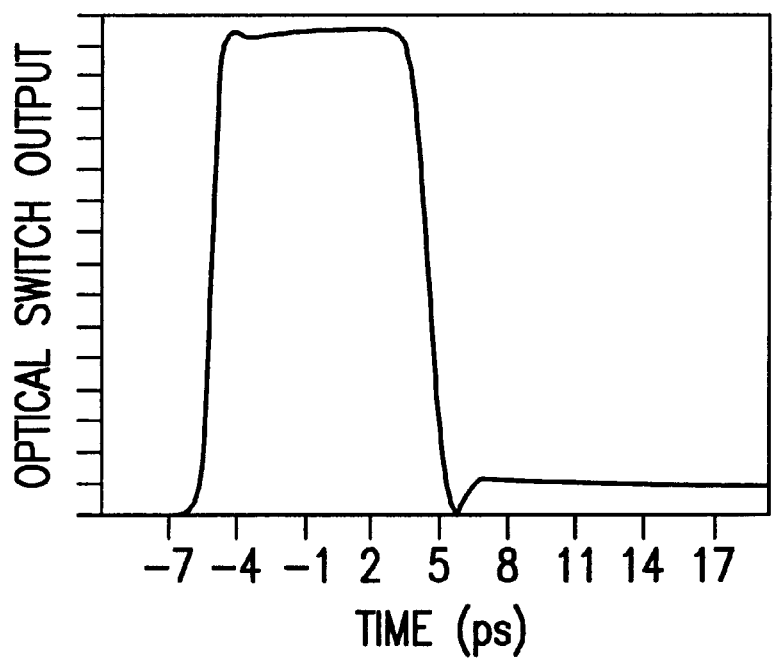

FIGS. 5(a) and 5(c) show a theoretical simulation of the phase response of the two interferometer arms and the resultant switching window for a known forward-pumped symmetric Mach-Zehnder TOAD in which a first control signal is sent to the NLE in one arm and a second control signal is sent only to the NLE in the other arm. FIG. 5(a) shows the phase response of the NLEs (in this case semiconductor optical amplifiers (SOAs)) in the two arms of the interferometer; FIG. 5(c) shows the output of the optical switch. Assuming both NLEs have the same gain and recovery time and the interferometer is properly balanced, the difference in the phase response of the two arms leads to a significant leakage of light to the output port after the switching window has been closed. This is shown by the output leakage in the switching window from 6 ps and beyond in FIG. 5(c). The SOA recovery time for this simulation was set to 50 ps. While the leakage is smaller for large SOA recovery times (>400 ps), it becomes more significant as the SOA recovery time decreases. This implies that devices working in high performance optical systems where the baseband data rate is greater than 2.5 Gb/s will suffer increased degradation from the leakage at the output.

Figure 5D:
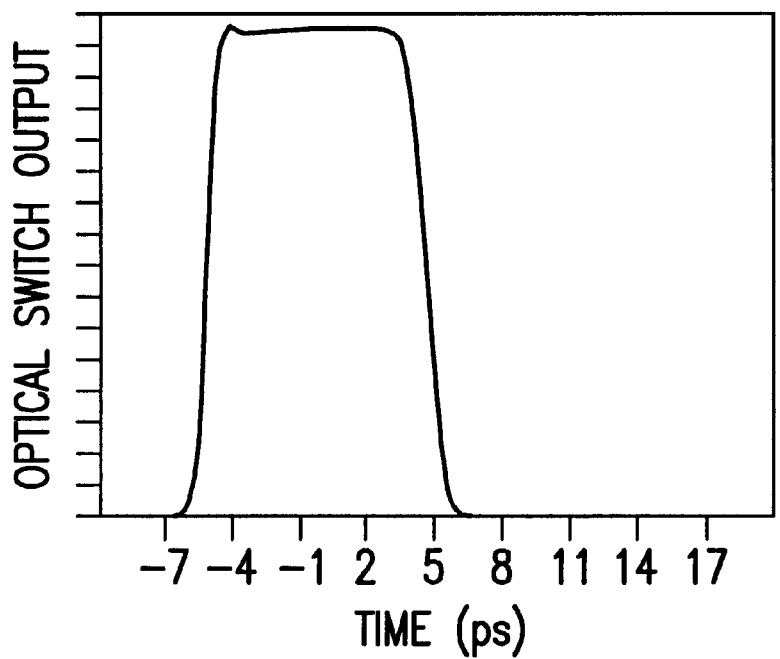

By clocking one of the nonlinear elements twice in a single switching event, the leakage can be eliminated. The configuration depicted in FIG. 1 with Δx=0 is simulated in FIGS. 5(b) and 5(d). These graphs show the phase response of the two SOAs in the optical switch and the resultant switching window, respectively. FIG. 5(b) shows the SOAs recovering in parallel after one SOA is clocked twice. FIG. 5(d) shows that the leakage at the output is eliminated, as illustrated by the flat region following the closure of the switching window that extends from 6 ps and beyond.

It should be understood that the embodiments described herein are merely illustrative and not intended to limit the scope of the invention. One skilled in the art may make various changes, rearrangements and modifications without substantially departing from the principles of the invention, which is limited only in accordance with the claims.

What is claimed is:

1. An optical switch comprising:
   a first optical arm and a second optical arm, each arm including a non-linear element having a first state and a second state;
   a first port connected to one of the first and second arms;
   a second port connected to both the first and second arms; and
   a third port connected to both the first and second arms such that two optical paths are formed between the second port and the third port, one including the first arm and the other including the second arm;
   wherein
   a first control signal input in the first port causes the non-linear element in the arm to which the first port is connected to become set to its second state;
   a second control signal input in one of the second and third ports causes the non-linear elements in both the first and second arms to become set to their respective second states; and
   an output data signal is produced on one of the second and third ports when a data signal input in the other of the second and third ports passes through the non-linear element in one of the first and second arms while that non-linear element is in its first state and passes through the non-linear element in the other arm while that non-linear element is in its second state and otherwise substantially no output data signal is produced.

2. The switch of claim 1 wherein the second and third ports are connected in a Mach-Zehnder interferometer configuration.

3. The switch of claim 1 wherein the non-linear elements in the first and second arms are substantially equidistant from the port in which the second control signal is input.

4. The switch of claim 1 wherein the second control signal and the data signal are input on one of the second and third ports and the output data signal is produced on the other of the second and third ports.

5. The switch of claim 4 further wherein the first control signal, the second control signal and the data signal co-propagate.

6. The switch of claim 4 further wherein the second control signal and the data signal counter-propagate with respect to the first control signal.

7. The switch of claim 1 wherein the second control signal and the data signal are input on different ones of the second and third ports.

8. The switch of claim 7 further wherein the first control signal and the second control signal co-propagate.

9. The switch of claim 7 further wherein the first control signal and the second control signal counter-propogate.

10. The switch of claim 1 wherein the second and third ports are connected in a Michelson interferometer configuration.

11. The switch of claim 10 wherein the non-linear elements are each reflective on one end and non-reflective on the other end and the first port is connected to the non-reflective end of the non-linear element in the arm to which it is connected and the second and third ports are connect to the non-reflective ends of the non-linear elements in both arms.

12. The switch of claim 10 wherein the non-linear elements are each partially reflective on one end and non-reflective on the other end and the first port is connected to the partially reflective end of the non-linear element in the arm to which it is connected and the second and third ports are connect to the non-reflective ends of the non-linear elements in both arms.

13. The switch of claim 1 wherein the second state of each non-linear element causes a $\pi$ phase shift in light passing through it compared to the phase of the light passing through it in its first state.

14. The switch of claim 1 wherein the first state of each non-linear element is nonsaturation and the second state is saturation.

15. An optical switch comprising:
a first optical arm and a second optical arm, each arm including a non-linear element having a first state and a second state; each non-linear element partially reflective on one end and non-reflective on the other end;
a first port connected to the partially reflective side of the non-linear element in the first arm;
a second port connected to the non-reflective side of the non-linear elements in the first and second arms;
a third port connected to the non-reflective side of the non-linear elements in the first and second arms such that two optical paths are formed between the second port and the third port, one including the first arm and the other including the second arm; and
a fourth port connected to the partially reflective side of the non-linear element in second arm;
wherein
a first control signal input in the first port causes the non-linear element in the first arm to become set to its second state;
a second control signal and a third control signal input in the first and fourth ports, respectively, cause the non-linear elements in the first and second arms to enter their second state at substantially the same time; and
an output data signal is produced on the third port when a data signal input in the second port passes through the non-linear element in the first arm while it is in its second state and passes through the non-linear element in the second arm while it is in its first state and otherwise substantially no output data signal is produced.

16. The switch of claim 15 wherein the second state of each non-linear element causes a $\pi$ phase shift in light passing through it compared to the phase of the light passing through it in its first state.

17. The switch of claim 15 wherein the first state of each non-linear element is non-saturation and the second state is saturation.

18. A method of switching an optical signal using an optical switch comprising a first and second optical arm, each arm including a non-linear element having a first and second state, a first port connected to the first arm, a second port connected to both arms and a third port connected to both arms such that two optical paths are formed between the second port and the third port, one including the first arm and one including the second arm, comprising the steps of:
causing the non-linear element in the first arm to become set to its second state by injecting a first control pulse in the first port;
injecting a data pulse in one of the second or third ports; and
causing the non-linear elements in both the first and second arms to become set their respective second states at substantially the same time by injecting a second control pulse in one of the second or third ports.

* * * * *